United States Patent
Jang et al.

(10) Patent No.: US 12,026,911 B2
(45) Date of Patent: Jul. 2, 2024

(54) APPARATUS FOR CHECKING BATTERY POSITION AND OPERATING METHOD THEREOF

(71) Applicant: Kookmin University Industry Academy Cooperation Foundation, Seoul (KR)

(72) Inventors: Yeong Min Jang, Seoul (KR); Utama Ida Bagus Krishna Yoga, Seoul (KR); Ahmed Md. Faisal, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 360 days.

(21) Appl. No.: 17/564,890

(22) Filed: Dec. 29, 2021

(65) Prior Publication Data

US 2023/0045732 A1 Feb. 9, 2023

(30) Foreign Application Priority Data

Aug. 9, 2021 (KR) .................. 10-2021-0104791
Dec. 8, 2021 (KR) .................. 10-2021-0174909

(51) Int. Cl.
*G06T 7/73* (2017.01)

(52) U.S. Cl.
CPC ...... *G06T 7/74* (2017.01); *G06T 2207/20081* (2013.01); *G06T 2207/20084* (2013.01)

(58) Field of Classification Search
CPC ............. G06T 7/74; G06T 2207/20081; G06T 2207/20084; G06T 2207/30108
See application file for complete search history.

(56) References Cited

U.S. PATENT DOCUMENTS

2016/0041359 A1 * 2/2016 Gaskin .................. G02B 7/003
                                                        33/286
2019/0362482 A1 * 11/2019 Han ...................... H05K 13/08

FOREIGN PATENT DOCUMENTS

| JP | 3795373 B2 * | 7/2006 |
| KR | 20020085266 A * | 11/2002 |
| KR | 10-2017-0071077 A | 6/2017 |
| KR | 10-2019-0011565 A | 2/2019 |
| KR | 10-2019-0051624 A | 5/2019 |

(Continued)

OTHER PUBLICATIONS

Office Action dated Sep. 1, 2022 in KR Application No. 10-2021-0174909.

*Primary Examiner* — Carol Wang
(74) *Attorney, Agent, or Firm* — Knobbe, Martens, Olson, & Bear, LLP

(57) ABSTRACT

This application relates to a battery test apparatus and an operating method thereof to check whether the direction of battery cells provided inside a battery tray is correct by implementing a computer vision AI algorithm. In one aspect, the method includes performing a first test for checking whether a battery tray has been correctly aligned with the battery test apparatus. The method may also include capturing a battery tray image including a plurality of battery cells using a camera upon alignment of the battery tray. The method may further include obtaining related information on battery cells from the battery tray image, and loading the related information on the battery cells. The method may further include performing a second test for checking whether directions of the battery cells are correct.

18 Claims, 11 Drawing Sheets

(56) References Cited

FOREIGN PATENT DOCUMENTS

| KR | 10-2019-0105093 A | 9/2019 |
|---|---|---|
| WO | 2020/130184 A1 | 6/2020 |

\* cited by examiner

APPARATUS FOR CHECKING BATTERY POSITION AND OPERATING METHOD THEREOF

CROSS-REFERENCE TO RELATED APPLICATIONS

The present application claims priority to Korean Patent Application No. 10-2021-0104791 filed on Aug. 9, 2021, and Korean Patent Application No. 10-2021-0174909 filed on Dec. 8, 2021 in the Korean Intellectual Property Office, each of which is incorporated herein in its entirety by reference.

BACKGROUND

Technical Field

The present disclosure relates to a battery test apparatus and an operating method thereof to check whether a direction of a battery cell provided inside a battery tray is correct by implementing a computer vision AI algorithm. The present disclosure resulted from "Intelligent Internet of Energy (IoE) Data Research" of "University ICT Research Center Support Project" supported by the Ministry of Science and ICT (Project No.: 1711126106).

Description of Related Technology

In a battery production process, a battery cell direction is manually checked by an operator. When the direction of a battery cell is checked, if the direction of the battery cell provided in a battery tray is not correct, the operator manually changes the direction of the battery cell. This manual checking procedure has a problem in that it takes more than 15 seconds to check one battery tray. In addition, although the direction of the battery cell in the battery tray is not substantially correct, the operator may mistakenly determine that the direction of the battery cell is correct. Such a mistake of the operator may cause problems in battery production.

The above-described related art is technical information possessed by the inventor for derivation of the present disclosure or acquired in the process of derivation of the present disclosure and cannot necessarily be said to be a known technology disclosed to the general public prior to the filing of the present disclosure.

SUMMARY

Therefore, the present disclosure has been made in view of the above problems, and it is an object of the present disclosure to solve the problem of the prior art that battery cell direction checking is manually performed by an operator and thus takes a long time and increases test cost.

An object of the present disclosure is to solve the problem of the prior art that, although the direction of a battery cell in a battery tray is not correct, an operator mistakenly determines that the direction of the battery cell is correct, deteriorating objective test reliability.

An object of the present disclosure is to automatically check whether the direction of a battery cell provided inside a battery tray is correct by implementing a computer vision AI algorithm.

The problems to be solved by the present disclosure are not limited to the above-mentioned problems, and other problems and advantages of the present disclosure that are not mentioned can be understood by the following description and more clearly understood by embodiments of the present disclosure. In addition, it will be appreciated that the problems and to be solved by the present disclosure can be realized by means and combinations thereof described in the claims.

In accordance with the present disclosure, the above and other objects can be accomplished by the provision of a battery test method performed by a processor of a battery test apparatus, the method including performing a first test for checking whether a battery tray has been correctly aligned with the battery test apparatus, capturing a battery tray image including a plurality of battery cells using a camera upon alignment of the battery tray, obtaining related information on battery cells from the battery tray image, and loading the related information on the battery cells and performing a second test for checking whether directions of the battery cells are correct.

In accordance with another aspect of the present disclosure, there is provided a battery test apparatus including a camera provided to face a position at which a battery tray is disposed, a processor, and a memory operably connected to the processor and storing at least one code executed in the processor, wherein the memory stores code that causes, when executed by the processor, the processor to perform a first test for checking whether the battery tray has been correctly aligned in accordance with the battery test apparatus, to capture a battery tray image including a plurality of battery cells using the camera upon alignment of the battery tray, to obtain related information on battery cells from the battery tray image, and to load the related information on the battery cells and perform a second test for checking whether directions of the battery cells are correct.

In addition, other methods for implementing the present disclosure, other systems, and other computer-readable recording media storing computer programs for executing the methods may be further provided.

Aspects, features and advantages other than those described above will become apparent from the following drawings, claims, and detailed description of the present disclosure.

According to the present disclosure, it is possible to solve the problem of the prior art that battery cell direction checking takes a long time and increases test cost by automatically checking a battery cell direction instead of manually checking the same by an operator.

In addition, it is possible to solve the problem of the prior art that, although the direction of a battery cell in a battery tray is not correct, an operator mistakenly determines that the direction of the battery cell is correct, deteriorating objective test reliability.

Furthermore, it is possible to automatically check whether the direction of a battery cell provided inside a battery tray is correct by implementing a computer vision AI algorithm to obtain objective and correct results within a short time.

Effects of the present disclosure are not limited to those mentioned above and other effects that are not mentioned will be clearly understood by those skilled in the art from the following description.

BRIEF DESCRIPTION OF THE DRAWINGS

The above and other objects, features and other advantages of the present disclosure will be more clearly understood from the following detailed description taken in conjunction with the accompanying drawings.

DETAILED DESCRIPTION

Figure 1:
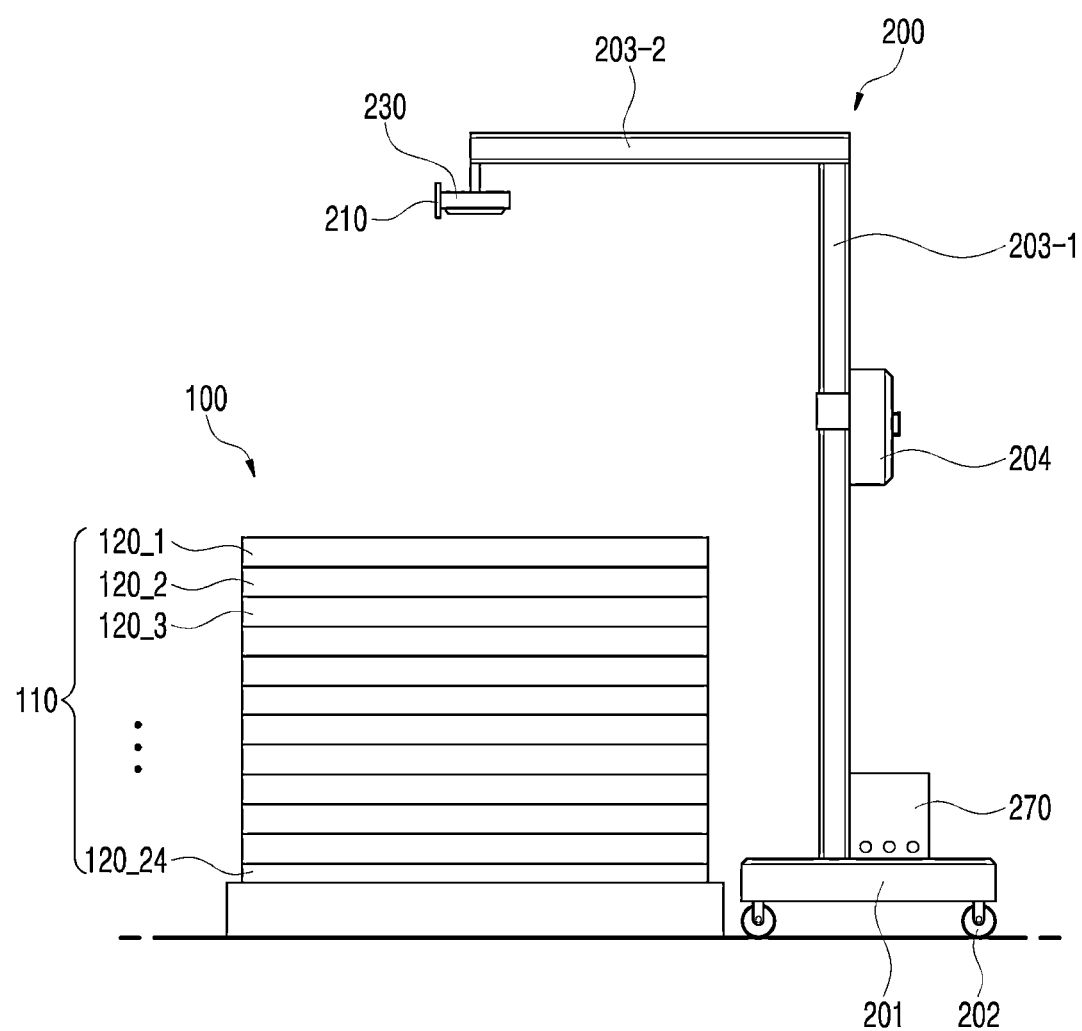
FIG. 1 and FIG. 2 are exemplary diagrams of a battery test environment including a battery and a battery test apparatus according to the present embodiment.

The advantages and features of the present disclosure and the way of attaining the same will become apparent with reference to embodiments described below in detail in conjunction with the accompanying drawings. The present disclosure, however, is not limited to the embodiments disclosed hereinafter and may be embodied in many different forms. The disclosure is to cover all modifications, equivalents, and alternatives falling within the spirit and scope of the present disclosure. Embodiments which will be described below are provided so that the disclosure will be through and complete and will fully convey the scope to those skilled in the art. A detailed description of known functions and configurations incorporated herein will be omitted when it may obscure the subject matter of the present disclosure.

The terms used in the present application are only used to describe specific embodiments and are not intended to limit the present disclosure. In the present application, terms such as "comprise" or "have" are intended to designate that a feature, number, step, operation, component, part, or combination thereof described in the specification exists, but the possibility of addition or existence of one or more other features, numbers, steps, operations, components, parts, or combinations thereof is not precluded. Terms such as first, second, etc. may be used to describe various elements, but the elements should not be limited by the terms. The above terms are used only for the purpose of distinguishing one component from another.

In the present application, "unit" may be a hardware component such as a processor or a circuit and/or a software component executed by a hardware component such as a processor.

Hereinafter, embodiments according to the present disclosure will be described in detail with reference to the accompanying drawings. In description with reference to the accompanying drawings, the same or corresponding components are denoted by the same reference numerals and redundant description thereof will be omitted.

Figure 2:
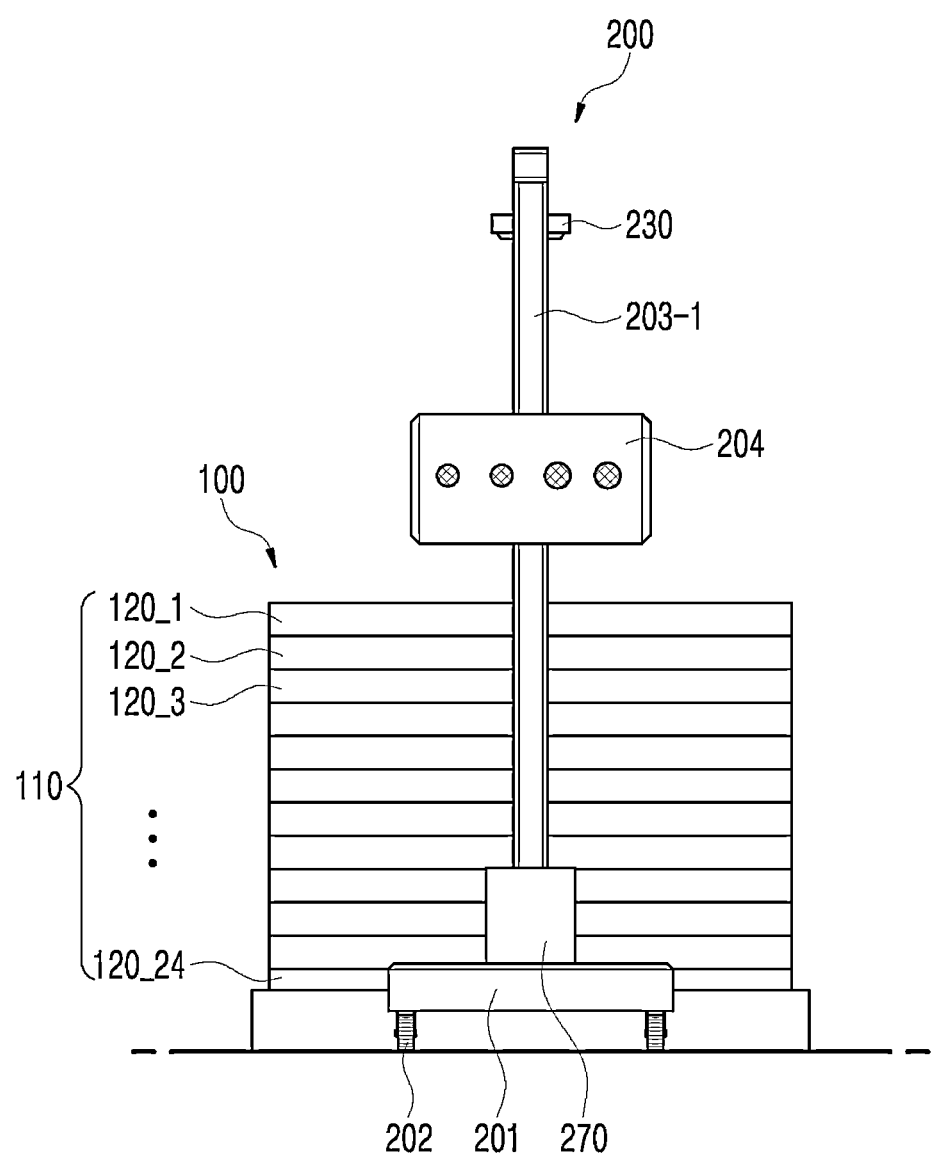
Figure 3:
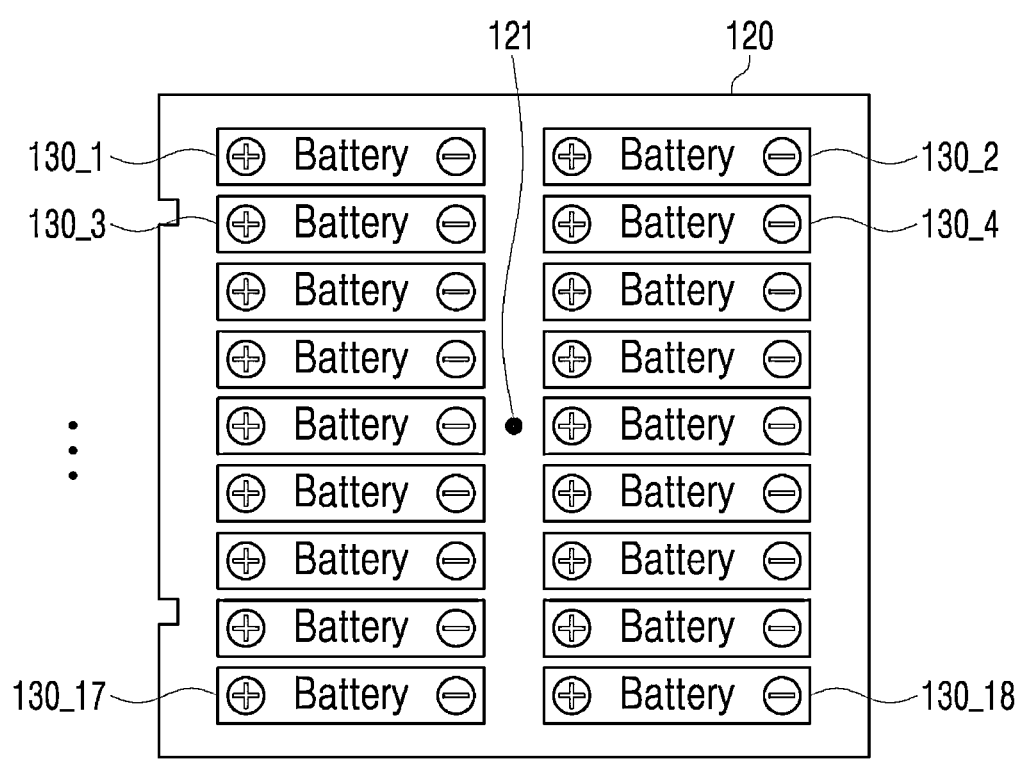
FIG. 3 and FIG. 4 are exemplary diagrams showing a plurality of battery cells provided in a battery tray according to the present embodiment.
Figure 4:
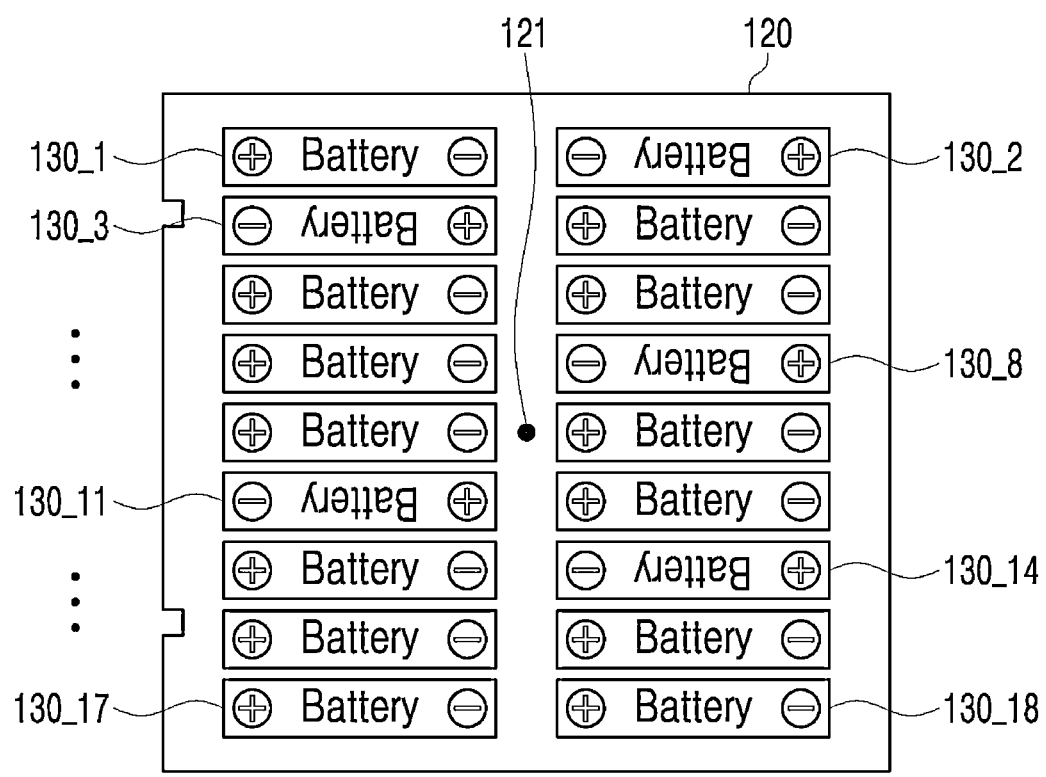

FIG. 1 and FIG. 2 are exemplary diagrams of a battery test environment including a battery and a battery test apparatus according to the present embodiment and FIG. 3 and FIG. 4 are exemplary diagrams showing a plurality of battery cells provided inside a battery tray according to the present embodiment. Referring to FIG. 1 to FIG. 4, the battery test environment may include a battery 100 and a battery test apparatus 200.

The battery 100 may include a battery stack 110, battery trays 120 (120_1 to 120_24), and battery cells 130 (130_1 to 130_18). In the present embodiment, one battery stack 110 may be composed of 24 battery trays 120. In the present embodiment, the number of battery trays 120 constituting one battery stack 110 is not limited to 24 and may be changed.

Referring to FIG. 3 and FIG. 4, one battery tray 120 may include 18 battery cells 130. The battery cell 130 is a rechargeable battery and may be a lithium ion battery cell, but the present disclosure is not limited thereto. Although an example in which 18 battery cells 130 are accommodated in one tray 120 is illustrated in the present embodiment, the number of battery cells 130 can be adjusted according to desired output power. In addition, the battery cell 130 may include battery cells having various shapes, such as cylindrical and rectangular battery cells.

Positions of the battery cells 130 in the battery trays 120 may be fixed. The direction of the battery cell 130 in the battery tray 120 needs to exactly coincide with a reference direction. Here, the reference direction of the battery cells 130 may include a direction in which a positive (+) pole sign is on the left and a negative (−) pole sign is on the right. In the present embodiment, a case in which the direction of the battery cell 130 is correct may include cases in which the direction of the battery cell 130 coincides with the reference direction.

FIG. 3 shows that the directions of first battery cells 130_1 to eighteenth battery cells 130_18 all coincide with the reference direction and thus the directions of the battery cells 130 are correct.

However, the direction of the battery cell 130 in the battery tray 120 may not coincide with the reference direction. This may occur when an operator mistakenly mounts the battery cell 130 in a direction different from the reference direction in the battery tray 120. Here, a case in which the direction of the battery cell 130 is different from the reference direction may include a case in which the positive (+) pole sign is on the right and the negative (−) pole sign is on the left.

Referring to FIG. 4, among the first battery cells 130_1 to the eighteenth battery cells 130_18, it can be ascertained that the third battery cell 130_3, the eighth battery cell 130_8, the eleventh battery cell 130_11, and the fourteenth battery cell 130_14 are mounted in a direction different from the reference direction. In the present embodiment, a case in which the direction of the battery cell 130 is incorrect may include a case in which the direction of the battery cell 130 is different from the reference direction.

As described above, when the direction of the battery cell 130 is incorrect due to operator error, a problem may occur in battery production. In addition, when the direction of the battery cell 130 is manually checked by an operator, battery cell direction checking may take a long time and increase the test cost.

In order to solve such problems, the battery test apparatus 200 may implement a computer vision AI algorithm to automatically check whether the direction of each of the plurality of battery cells 130 provided in the battery tray 120 is correct.

Referring to FIG. 1 and FIG. 2, the battery test apparatus 200 may include a base frame 201, a plurality of wheels 202, a body frame 203, a control box 204, a laser generator 210, a camera 230, and a power supply 270. In the present embodiment, components other than the laser generator 210, the camera 230 and the power supply 270 among the components shown in FIG. 5 may be provided inside the control box 204. In addition, the components provided in the control box 204 may be electrically connected to the laser generator 210, the camera 230, and the power supply 270 to transmit/receive signals thereto/therefrom.

The plurality of wheels 202 may be provided under the base frame 201. The body frame 203 may be provided above the base frame 201. In addition, the power supply 270 may be provided on the base frame 201.

The plurality of wheels 202 may move or stop the battery test apparatus 200. In the present embodiment, the number of wheels 202 may be two or more.

The body frame 203 may include a first support frame 203-1 and a second support frame 203-2. The first support frame 203-1 may extend upward from the base frame 201. That is, the base frame 201 may be connected to one side of the first support frame 203-1 and the second support frame 203-2 may be connected to the other side of the first support frame 203-1. The second support frame 203-2 may extend in a lateral direction of the first support frame 203-1. The other side of the first support frame 203-1 may be connected to one side of the second support frame 203-2, and the camera 230 may be connected to the other side of the second support frame 203-2. The laser generator 210 may be connected to one side of the camera 230.

The control box 204 may be provided on the first support frame 203-1. A user interface 220, a first test unit 240, a battery information acquisition unit 250, a second test unit 260, and a controller 280 shown in FIG. 5 may be provided inside the control box 204. A test start button (not shown) included in the user interface 220 may protrude outside the control box 204. In addition, a control panel (not shown) or a speaker (not shown) included in the user interface 220 may be provided outside the control box 204 to output results of a first test and a second test. Hereinafter, the control box 204 will be described with reference to FIG. 5.

The operator may move the battery test apparatus 200 while holding the body frame 203. As shown in FIG. 1 and FIG. 2, the battery test apparatus 200 may be moved to a position where the camera 230 provided in the battery test apparatus 200 can face the battery stack 110.

The laser generator 210 can radiate a laser beam. In the present embodiment, when power is supplied to the battery test apparatus 200, the laser generator 210 can start to radiate a laser beam. In addition, the laser generator 210 may further include a sensor (not shown) capable of receiving a reflected laser beam.

The battery test apparatus 200 may perform the first test for checking whether the alignment of the battery tray 120 is correct on the basis of the laser generator 210 and the sensor.

The battery test apparatus 200 may control the laser generator 210 such that it radiates a laser beam to the battery tray 120. The battery test apparatus 200 may receive a laser beam reflected from the battery tray 120 through the sensor. The battery test apparatus 200 may determine that the alignment of the battery tray 120 is correct if the signal strength of the laser beam reflected from the battery tray 120 is equal to or greater than a reference value. The battery test apparatus 200 may determine that the alignment of the battery tray 120 is incorrect if the signal strength of the laser beam reflected from the battery tray 120 is less than the reference value.

Upon determining that the alignment of the battery tray 120 is incorrect, the battery test apparatus 200 may generate a first alarm for inducing rearrangement of the battery tray 120.

In an optional embodiment, the battery tray 120 may be provided with a support (not shown) for supporting the bottom thereof. In addition, the battery test apparatus 200 may further include an additional laser generator (not shown) for generating a laser beam toward the bottom of the battery tray 120. The battery tray 120 may include at least one penetration hole (not shown) such that a laser beam radiated from the additional laser generator can pass therethrough when the battery tray 120 is arranged to be aligned with the battery test apparatus 200. Here, the penetration hole may include a hole through which light can pass or a through hole and may include a hole filled with a transparent material. In addition, an additional sensor (not shown) for detecting the laser beam that has passed through the penetration hole may be further included in the support. Accordingly, the battery test apparatus 200 can determine that the battery tray 120 has been aligned when a laser beam radiated from the additional laser generator is detected by the additional sensor of the support.

The camera 230 may capture an image (hereinafter referred to as a battery tray image) of the battery tray 120 provided with the plurality of battery cells 130, as shown in FIG. 3 and FIG. 4. The camera 230 may be installed to face a position where the battery tray 120 is disposed. In the present embodiment, the camera 230 may capture an image of the battery tray 120 as a subject in a photographing area using, for example, a complementary metal-oxide semiconductor (COMS) module or a charge coupled device (CCD) module. In addition, in the present embodiment, a point in time at which the camera 230 captures an image of the battery tray 120 may be a point in time after the alignment of the battery tray 120 is determined to be correct as a result of the first test.

The battery test apparatus 200 may perform an additional test for additionally checking whether the alignment of the battery tray 120 is correct on the basis of a battery tray image captured by the camera 230. If the alignment of the battery tray 120 is incorrect as a result of the additional test, the battery test apparatus 200 may generate a second alarm. Details of the additional test will be described later.

The battery test apparatus 200 may obtain related information on battery cells from a battery tray image. Here, the battery tray image may include, for example, 18 battery cell images. Accordingly, for each of the 18 battery cells, the battery test apparatus 200 may obtain related information on the battery cells.

In the present embodiment, the related information on the battery cells may be obtained using an artificial intelligence algorithm. Here, artificial intelligence (AI) is a field of computer science and information technology for realizing methods of performing thinking, learning, and self-development that can be done with human intelligence through computers and may refer to technology for causing computers to imitate intelligent human behavior.

AI does not exist by itself but is directly or indirectly related to other fields of computer science. In particular, attempts to introduce elements of artificial intelligence to various fields of information technology and to use the same to solve problems in those fields have been actively made in recent times.

Machine learning is a branch of artificial intelligence, which can include fields of study that give computers the ability to learn without explicit programming. Specifically, machine learning can be said to be a technology for studying and constructing systems for performing learning based on empirical data, carrying out prediction, and improving the performance thereof, and algorithms therefor. Algorithms in machine learning can take approaches of building specific models to make predictions or decisions based on input data, rather than executing rigidly set static program instructions.

As a machine learning method of an artificial neural network, both unsupervised learning and supervised learning may be used. In addition, deep learning technology, which is a kind of machine learning, can perform learning to a deep level in multiple stages based on data. Deep learning can represent a set of machine learning algorithms that extract core data from a plurality of pieces of data as the level increases.

In the present embodiment, the artificial intelligence algorithm used to obtain related information on battery cells may include a modified you only look once (YOLO) algorithm.

In general, the YOLO algorithm is a deep learning based algorithm that assumes the type and location of an object by looking at an image once. In the present embodiment, an object may include the battery cell 130. The YOLO algorithm may be an algorithm that can improve a training and detection speed by approaching object recognition through regression to simplify the overall structure.

In the present embodiment, the battery test apparatus 200 may create a modified YOLO algorithm by adding three convolution layers and three batch normalization layers to the head of the YOLO architecture. The modified YOLO algorithm may use a supervised learning method that requires image data (an image of a battery tray including a plurality of battery cells) in a training process. To this end, image data may be collected by changing image and object conditions to cover all possible situations in the actual field.

In the present embodiment, the related information on the battery cells obtained using the modified YOLO algorithm may include first information to fourth information.

The first information may indicate a predicted position of the battery cell 130 in a battery tray image. In the present embodiment, the first information includes a start position $(x_{start}, y_{start})$ of the battery cell 130 included in the battery tray image, the width w of the battery cell 130, and the height h of the battery cell 130.

Figure 6:
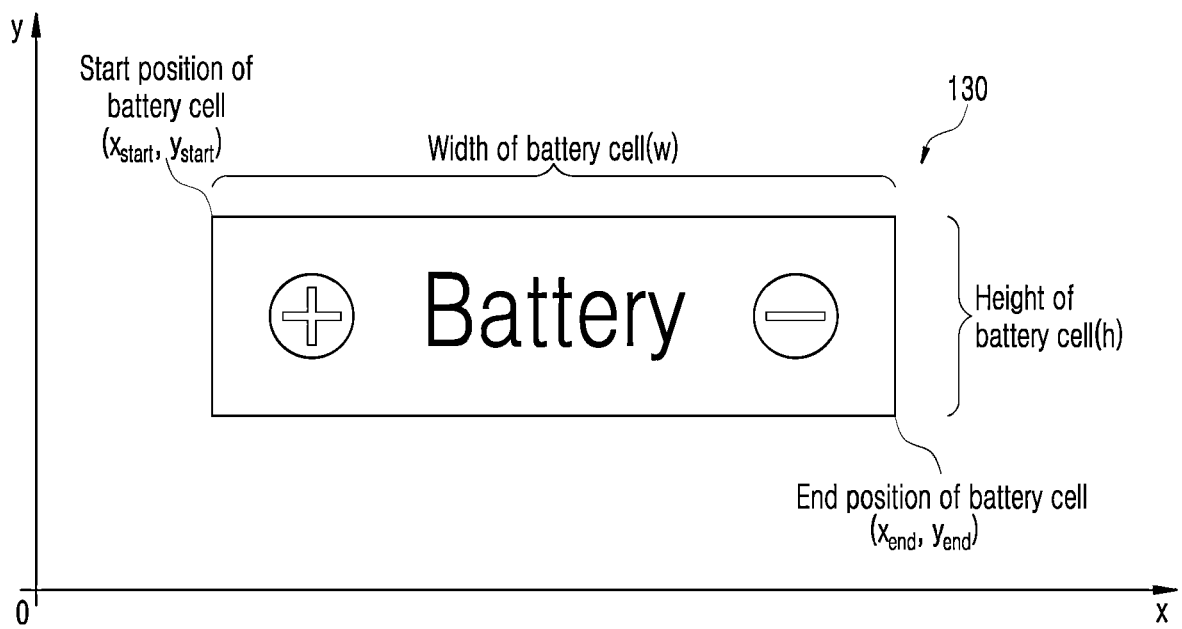
FIG. 6, FIG. 7, and FIG. 8 are exemplary diagrams illustrating parameter calculation for checking whether a direction of a battery cell is correct according to the present embodiment.

In the present embodiment, the start position and the end position of the battery cell 130 may be arbitrarily defined according to the embodiment. For example, to define the start position and the end position of the battery cell 130 (refer to FIG. 6), it is assumed that the battery cell 130 has a rectangular shape and is disposed on two-dimensional coordinates as shown in FIG. 6. Accordingly, the start position of the battery cell 130 may include an x-coordinate value and a y-coordinate value corresponding to the upper left vertex, that is, $(x_{start}, y_{start})$, or (200, 300) of FIG. 7. Further, the end position of the battery cell 130 may include an x-coordinate value and a y-coordinate value corresponding to the lower right vertex, that is, $(x_{end}, y_{end})$ or (500, 450) of FIG. 7.

The second information may include the total number of battery cells 130 in the battery tray image. In the present embodiment, the second information may include 18 battery cells 130.

The third information may indicate predicted positions of the positive (+) pole sign and the negative (−) pole sign indicated on the battery cell 130 in the battery tray image. In the present embodiment, the third information may include a start position $(x_+, y_+)$ of the positive (+) pole sign indicated on the battery cell 130 and a start position $(x_-, y_-)$ of the negative (−) pole sign indicated on the battery cell 130.

Figure 8:
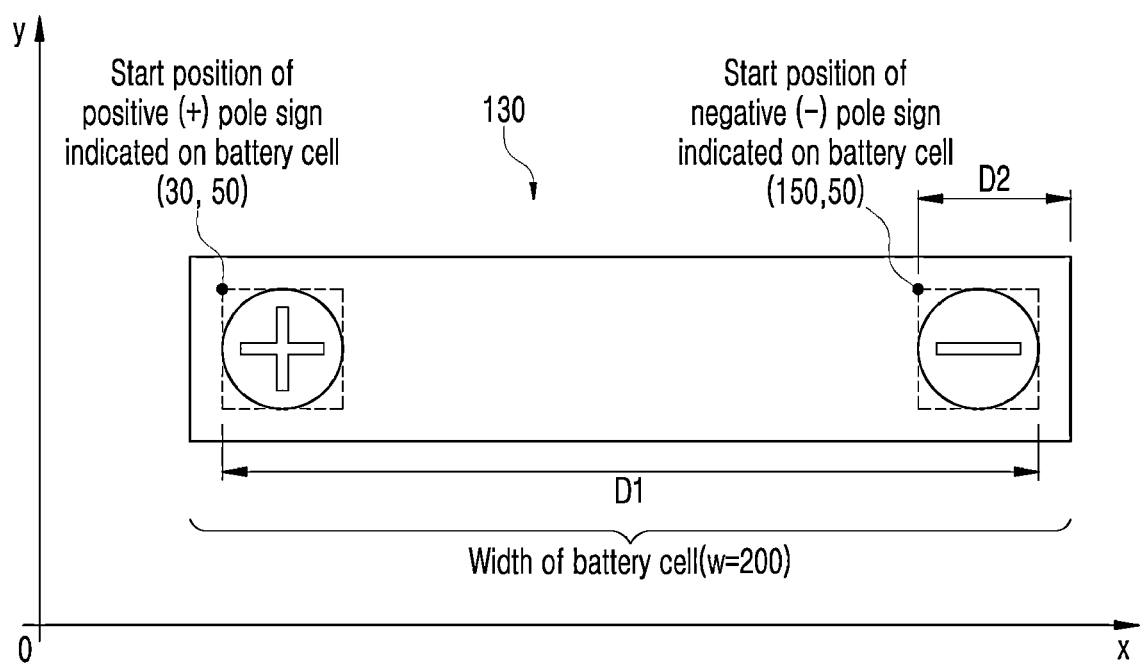

In the present embodiment, the start position of the positive (+) pole sign indicated on the battery cell 130 and the start position of the negative (−) pole sign indicated on the battery cell 130 may be arbitrarily defined according to the embodiment. For example, to define the start position of the positive (+) pole sign indicated on the battery cell 130 and the start position of the negative (−) pole sign indicated on the battery cell 130 (refer to FIG. 8), it is assumed that 130 the battery cell has a rectangular shape and is disposed on two-dimensional coordinates as shown in FIG. 8.

Accordingly, the start position of the positive (+) pole sign indicated on the battery cell 130 may include an x-coordinate value and a y-coordinate value corresponding to the upper left vertex of a square having a minimum size which includes the positive (+) pole sign, for example, (30, 50). In addition, the start position of the negative (−) pole sign indicated on the battery cell 130 may include an x-coordinate value and a y-coordinate value corresponding to the upper left vertex of a square having a minimum size which includes the negative (−) pole sign, for example, (150, 50).

The fourth information may indicate the total number of positive (+) pole signs and negative (−) pole signs detected from the battery tray image. In the present embodiment, the fourth information may include 36 signs.

The battery test apparatus 200 may load the related information on the battery cell and perform a second test for checking whether the direction of the battery cell 130 is correct. In the present embodiment, the battery test apparatus 200 may perform the second test on each of the 18 battery cells 130. Details of the second test will be described later.

As a result of performing the secondary test, the battery test apparatus 200 may generate a third alarm for inducing a change in the direction of the battery cell 130 when it is determined that the direction of the battery cell 130 is incorrect. In the present embodiment, the third alarm may be continuously generated until the direction of the battery cell 130 becomes correct.

The battery test apparatus 200 may also output information on change target battery cells 130 when generating the third alarm. Here, the information on change target battery cells 130 may include the number of battery cells 130 whose directions are incorrect and thus need to be changed. Referring to FIG. 4, information on the change target battery cells 130 may include the third battery cell 130_3, the eighth battery cell 130_8, the eleventh battery cell 130_11, and the fourteenth battery cell 130_14.

Referring to FIG. 1 and FIG. 2, when the battery test apparatus 200 completes the first test and the second test with respect to the first battery tray 120_1, the operator may move the first battery tray 120_1 and the battery test apparatus 200 may receive results of an initial battery tray alignment operation and perform the first test and the second test with respect to the second battery tray 120_2. In this way, the first test and the second test may be performed from the first battery tray 120_1 to the twenty-fourth battery tray 120_24. Accordingly, when the battery test apparatus 200 completes the test on one battery stack 110, the operator may start the test after moving the battery test apparatus 200 to another battery stack.

Figure 5:
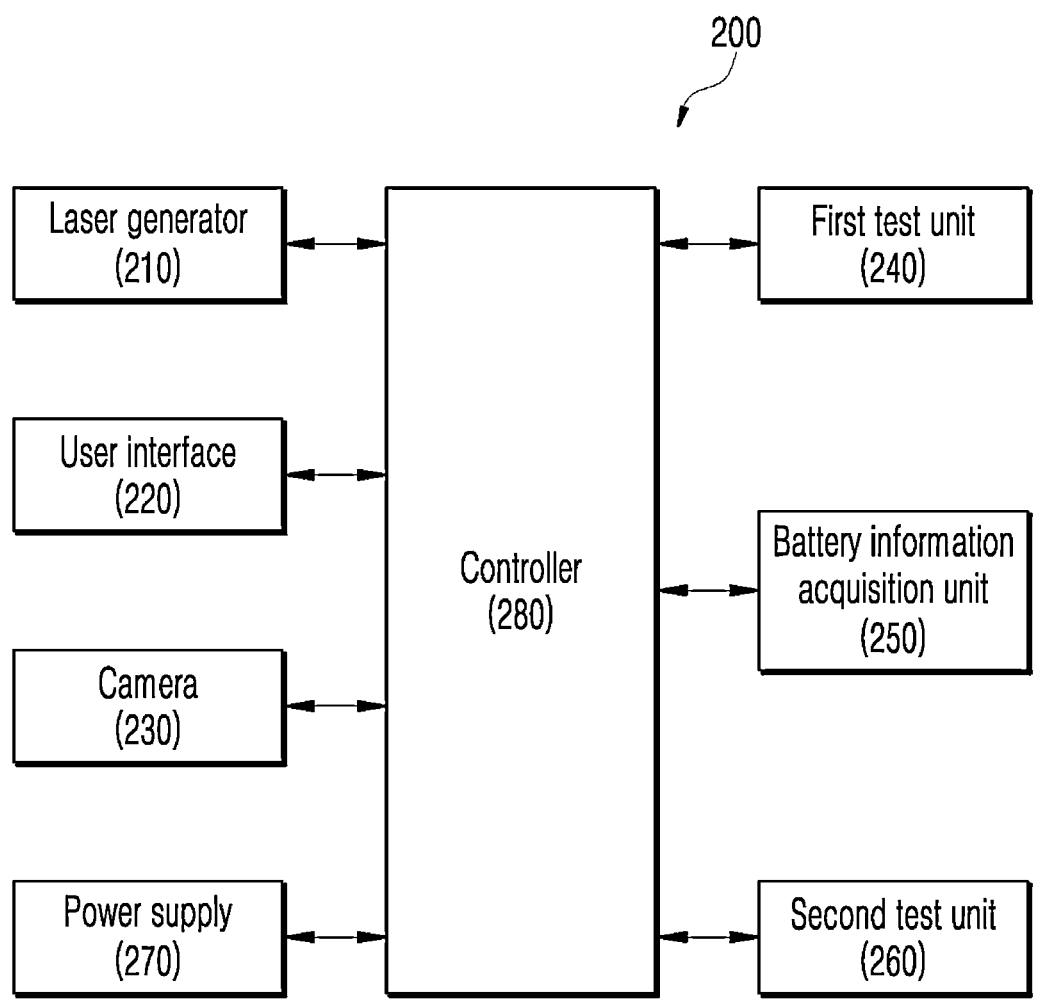
FIG. 5 is a block diagram schematically illustrating a configuration of a battery test apparatus according to the present embodiment.
Figure 7:
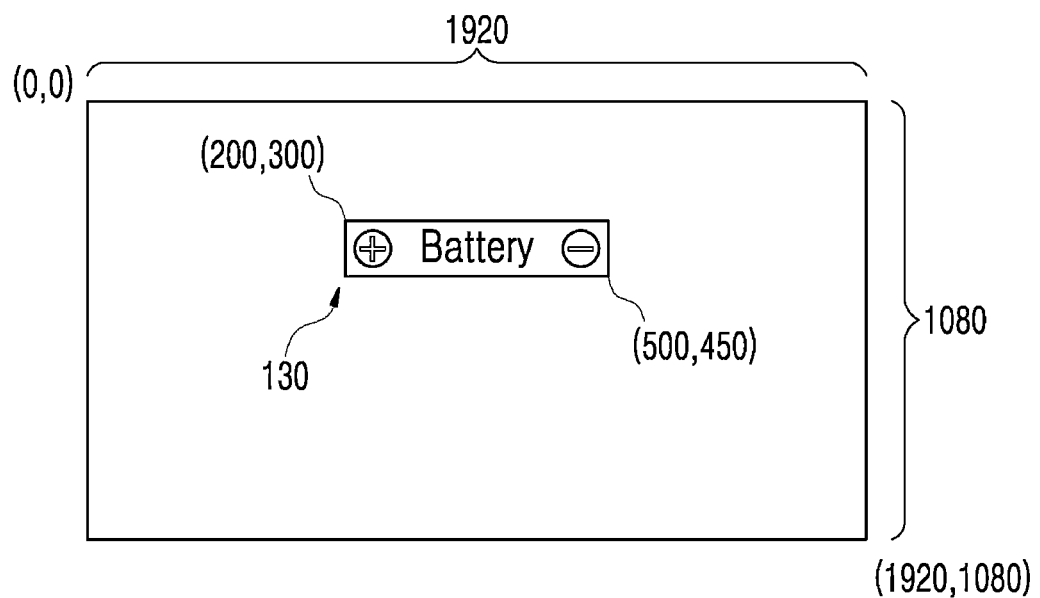

FIG. 5 is a block diagram schematically illustrating a configuration of the battery test apparatus according to the present embodiment and FIG. 6 to FIG. 8 are exemplary diagrams showing parameter calculation for checking whether the directions of the battery cells are correct according to the present embodiment. In the following, description of redundant parts in FIG. 1 to FIG. 8 will be omitted.

Referring to FIG. 5 to FIG. 8, the battery test apparatus 200 includes the laser generator 210, the user interface 220, the camera 230, the first test unit 240, the battery information acquisition unit 250, the second test unit 260, the power supply 270, and the controller 280. In the present embodiment, the user interface 220, the first test unit 240, the battery information acquisition unit 250, the second test 260, the power supply 270, and the controller 280 may be included in the control box 204 shown in FIG. 1 and FIG. 2.

The laser generator 210 may radiate a laser beam. When power is supplied to the battery test apparatus 200, the laser generator 210 may start to radiate a laser beam. In the present embodiment, the operator may perform the initial battery tray alignment operation using a laser beam generated by the laser generator 210.

The user interface 220 may include an input interface (not shown) and an output interface (not shown).

The input interface is a component through which the operator can input information related to the operation and control of the battery test apparatus 200 and may include, for example, a test start button. In an optional embodiment, the input interface may further include a microphone (not shown) for voice recognition. The microphone is an embodiment, and the location and implementation method thereof are not limited and an input means for audio signal input may be employed without limitation.

Meanwhile, in the present embodiment, the output interface may include a speaker (not shown). The speaker may output information related to the operation of the battery test apparatus 200 as auditory data. That is, the speaker may output information related to the operation of the battery test apparatus 200 as audio data. The speaker may output notification messages such as a warning sound, a notification sound, an error state, information corresponding to voice commands of the operator, processing results corresponding to voice commands of the operator, and the like as audio according to control of the controller 280. The speaker is an embodiment, and the location and implementation method thereof are not limited and may include any output means for audio signal output.

The output interface is a component through which the operator can output information related to the operation and control of the battery test apparatus 200. That is, the output interface is a component for interfacing with the operator.

That is, the user interface 220 is a component through which the operator can input information related to the battery test apparatus 200 and check information related to the battery test apparatus 200 and may include a control panel through which input and output can be performed. The user interface 220 may include, for example, a predetermined display member such as an organic light emitting display (OLED), a liquid crystal display (LCD), or a light emitting display (LED) capable of performing touch recognition.

The camera 230 may capture a battery tray image.

The first test unit 240 may check whether the alignment of the battery tray 120 is correct in connection with the laser generator 210 and the sensor. The first test unit 240 may receive a laser beam reflected from the battery tray 120 through the sensor of the test apparatus 200. The first test unit 240 may determine that the alignment of the battery tray 120 is correct if the signal strength of the laser beam reflected from the battery tray 120 is equal to or greater than a reference value. The first test unit 240 may determine that the alignment of the battery tray is incorrect if the signal strength of the laser beam reflected from the battery tray 120 is less than the reference value.

An identifier (121 in FIG. 3 and FIG. 4) indicating the center of the battery tray 120 is provided inside the battery tray 120. The operator may move the battery test apparatus 200 such that a laser beam coincides with the identifier 121.

After the operator moves the battery test apparatus 200, when a laser beam radiated from the laser generator 210 coincides with the identifier 121, the intensity of a laser beam reflected by the sensor may be equal to or greater than the reference value.

This may be because the signal strength of a laser beam reflected from the identifier 121 differs from the signal strength of a laser beam reflected from a part other than the identifier 121. Accordingly, in the present embodiment, the battery tray 120 may be manufactured by differentiating the material forming the identifier 121 and the portion around the identifier 121 from the material forming the portion other than the identifier 121 and the portion around the identifier 121. In addition, the battery tray 120 may be manufactured such that the reflectivity of the material forming the identifier 121 and the portion around the identifier 121 is greater than the reflectivity of the material forming the portion other than the identifier 121 and the portion around the identifier 121.

When the signal strength of the reflected laser beam is equal to or greater than the reference value, the battery test apparatus 200 may determine that the battery tray 120 is correctly aligned. However, when the signal strength of the reflected laser beam is less than the reference value, the battery test apparatus 200 may determine that the battery tray 120 is incorrectly aligned. Upon determining that the alignment of the battery tray 120 is incorrect, the battery test apparatus 200 may generate the first alarm for inducing rearrangement of the battery tray 120.

When the first alarm is generated, the operator may move the battery test apparatus 200. Alternatively, when the first alarm is generated, the operator may rearrange the battery tray. The first alarm may be continuously generated until the alignment of the battery tray 120 becomes correct.

The battery information acquisition unit 250 may acquire related information on battery cells from the battery tray image. The battery information acquisition unit 250 may predict the related information on battery cells using a deep neural network model trained in advance to predict information on battery cells using a battery tray image including a plurality of battery cells.

Here, the deep neural network model may be a model trained by a supervised learning method using training data having a battery tray image including a plurality of battery cells as input and having first information to fourth information as labels.

In the present embodiment, the information on battery cells obtained using the modified YOLO algorithm may include the first information to the fourth information.

The first information may indicate a predicted position of the battery cell 130 in the battery tray image. In the present embodiment, the first information may include a start position ($x_{start}$, $y_{start}$) of the battery cell 130 included in the battery tray image, the width w of the battery cell 130, and the height h of the battery cell 130.

The second information may include the total number of battery cells 130 in the battery tray image. In the present embodiment, the second information may include 18 battery cells 130.

The third information may indicate predicted positions of the positive (+) pole sign and the negative (−) pole sign indicated on the battery cell 130 in the battery tray image. In the present embodiment, the third information may include a start position ($x_+$, $y_+$) of the positive (+) pole sign indicated on the battery cell 130 and a start position ($x_-$, $y_-$) of the negative (−) pole sign indicated on the battery cell 130.

The fourth information may indicate the total number of positive (+) pole signs and negative (−) pole signs detected from the battery tray image. In the present embodiment, the fourth information may include 36 signs.

In the present embodiment, an initially configured deep neural network model is an initial model designed to be configured as a model capable of predicting information on battery cells, and parameter values are set to arbitrary initial values. The initial model may be completed as a deep neural network model for predicting related information on battery cells by being trained through the aforementioned training data such that parameter values are optimized.

In the present embodiment, the battery information acquisition unit 250 may perform an additional test for additionally checking whether the alignment of the battery tray 120 is correct using the battery tray image captured by the camera 230.

The battery information acquisition unit 250 may detect the battery cell 130 by applying a known object recognition algorithm to the battery tray image. In an optional embodiment, the battery information acquisition unit 250 may detect the battery cell 130 displayed in the battery tray image by comparing the battery tray image with previously stored battery cell images.

The battery information acquisition unit 250 may count the number of battery cells 130 included in the battery tray image.

The battery information acquisition unit 250 may determine that the battery tray 120 is correctly aligned if the counted number of battery cells 130 is equal to a preset reference number (e.g., 18).

On the other hand, the battery information acquisition unit 250 may determine that the battery tray 120 is incorrectly aligned if the counted number of battery cells 130 is different from the preset reference number.

Referring to FIG. 3 and FIG. 4, since the number of battery cells 130 mounted inside the battery tray 120 is fixed, the battery tray 120 can be determined to be correctly aligned if the number of battery cells 130 is equal to the reference number. However, if the number of battery cells 130 is different from the reference number, it means that the battery tray image deviates from a camera viewing angle, and thus the battery tray 120 may be determined to be inaccurately aligned.

Upon determining that the alignment of the battery tray 120 is incorrect, the battery information acquisition unit 250 may generate the second alarm for inducing rearrangement of the battery tray 120. When the second alarm is generated, the operator may move the battery test apparatus 200 or rearrange the battery tray 120.

The second test unit 260 may load related information on the battery cells from the battery information acquisition unit 250 and check whether the direction of the battery cell 130 is correct.

The second test unit 260 may calculate the end position ($x_{end}$, $y_{end}$) of the battery cell 130 in the battery tray image using the related information on the battery cells. The second test unit 260 may calculate the end position ($x_{end}$, $y_{end}$) of the battery cell 130 using FIG. 6 and Equation 1 below.

$$x_{end} = x_{start} + w$$

$$y_{end} = y_{start} + h \qquad \text{[Equation 1]}$$

In Equation 1, $x_{start}$ represents the start x-coordinate value of the battery cell 130 included in the first information, w represents the width of the battery cell 130 included in the first information, $y_{start}$ represents the start y-coordinate value of the battery cell 130 included in the first information, and h represents the height of the battery cell 130.

Referring to FIG. 6, for example, when the start position of the battery cell 130 is (200, 300), the width of the battery cell 130 is 300, and the height of the battery cell 130 is 150, the end position of the battery cell 130 may be (500, 450) according to Equation 1.

The second test unit 260 may extract a partial image including the start position ($x_{start}$, $y_{start}$) of the battery cell 130 and the end position ($x_{end}$, $y_{end}$) of the battery cell 130 from the battery tray image. In the present embodiment, the battery tray image may have a preset size (e.g., 1920×1080).

Referring to FIG. 7, the second test unit 260 may set the start position of the battery tray image to (0, 0), set the end position of the battery tray image to (1920, 1080), and extract a partial image including the start position (200 and 300) of the battery cell 130 and the end position (500 and 450) of the battery cell 130.

The second test unit 260 may calculate a first distance value D1 and a second distance value D2 from the partial image. The first distance value D1 may include a result obtained by subtracting the x-coordinate ($x_+$) value of the start position ($x_+$, $y_+$) of the positive (+) pole sign indicated on the battery cell 130 from the width w of the battery cell 130. The second distance value D2 may include a result obtaining by subtracting the x-coordinate ($x_-$) value of the start position ($x_-$, $y_-$) of the negative (−) pole sign indicated on the battery cell 130 from the width w of the battery cell 130.

The second test unit 260 may calculate the first distance value D1 and the second distance value D2 using FIG. 8 and Equation 2 below.

$$D1 = w - x_+$$

$$D2 = w - x_- \qquad \text{[Equation 2]}$$

In Equation 2, w denotes the width of the battery cell 130 included in the first information, and $x_+$ denotes the x-coordinate value of the start position ($x_+$, $y_+$) of the positive (+) pole sign indicated on the battery cell 130, and $x_-$ denotes the x-coordinate value of the start position ($x_-$, $y_-$) of the negative (−) pole sign indicated on the battery cell 130.

Referring to FIG. 8, the second test unit 260 may obtain a result (170) by subtracting the x-coordinate value (30) of the start position (30, 50) of the positive (+) pole sign indicated on the battery cell 130 from the width (w=200) of the battery cell 130 as the first distance value D1. In addition, the second test unit 260 may obtain a result (50) by subtracting the x-coordinate value (150) of the start position (150, 50) of the negative (−) pole sign indicated on the battery cell 130 from the width (w=200) of the battery cell 130 as the second distance value D2.

The second test unit 260 may determine whether the direction of the battery cell 130 is correct on the basis of a result of comparison between the first distance value D1 and the second distance value D2. The second test unit 260 may determine that the direction of the battery cell 130 is correct if the first distance value D1 exceeds the second distance value D2. A case in which the direction of the battery cell 130 is correct may include a case in which the positive (+) pole sign indicated on the battery cell 130 is positioned on the right and the negative (−) pole sign is positioned on the left. The second test unit 260 may determine that the direction of the battery cell 130 is incorrect if the first distance value D1 is equal to or less than the second distance value D2. A case in which the direction of the battery cell 130 is correct may include a case in which the positive (+) pole sign indicated on the battery cell 130 is positioned on the left and the negative (−) pole sign is positioned on the right.

When the first distance value D1 is equal to or less than the second distance value D2, the third alarm for inducing a change in the direction of the battery cell 130 may be generated. The second test unit 260 may also output information on change target battery cells when the third alarm is generated. Here, the information on change target battery cells may include the numbers of battery cells 130 whose directions are incorrect and thus need to be changed. For example, referring to FIG. 4, the information on change target battery cells 130 may include the third battery cell 130_3, the eighth battery cell 130_8, the eleventh battery cell 130_11, and the fourteenth battery cell 130_14.

The power supply 270 may receive external power or internal power under the control of the controller 280 to supply power to each component of the battery test apparatus 200. The power supply 270 may include a battery (not shown), and the battery may be configured as a built-in battery or a replaceable battery. The battery may be charged by a wired or wireless charging method, and the wireless charging method may include a magnetic induction method or a magnetic resonance method. In the present embodiment, the battery may include a rechargeable secondary battery such as a nickel-cadmium battery, a lead-acid battery, a nickel metal hydride battery (NiMH), a lithium ion battery, and a lithium polymer battery, without being limited thereto.

In the present embodiment, the controller 280 may control charging and discharging of the battery and may protect the battery by monitoring state information of the battery. For example, the controller 280 may execute an overcharge protection function, an overdischarge protection function, an overcurrent protection function, an overvoltage protection function, an overheating protection function, a cell balancing function, and the like for the battery. In addition, the controller 280 may obtain the current, voltage, temperature, residual power amount, lifespan, state of charge (SOC), and the like of the battery. For example, although not shown, the controller 280 may measure the voltage and temperature of the battery using a sensor (not shown). Upon detection of occurrence of an abnormal state such as overcharging, overdischarging, overcurrent, or a high temperature of the battery, the controller 280 may protect the battery by controlling charging and discharging of the battery.

The controller 280 is a kind of central processing unit and may control the overall operation of the battery test apparatus 200. The controller 280 may include all kinds of devices capable of processing data, such as a processor. Here, the "processor" may refer to a data processing device embedded in hardware having a physically structured circuit to execute a function represented by, for example, code or instructions included in a program. As an example of the data processing device embedded in hardware as described above, a processing device such as a microprocessor, a central processing unit (CPU), a processor core, a multiprocessor, an application-specific integrated circuit (ASIC), or a field programmable gate array (FPGA) may be employed, but the scope of the present disclosure is not limited thereto.

Figure 9:
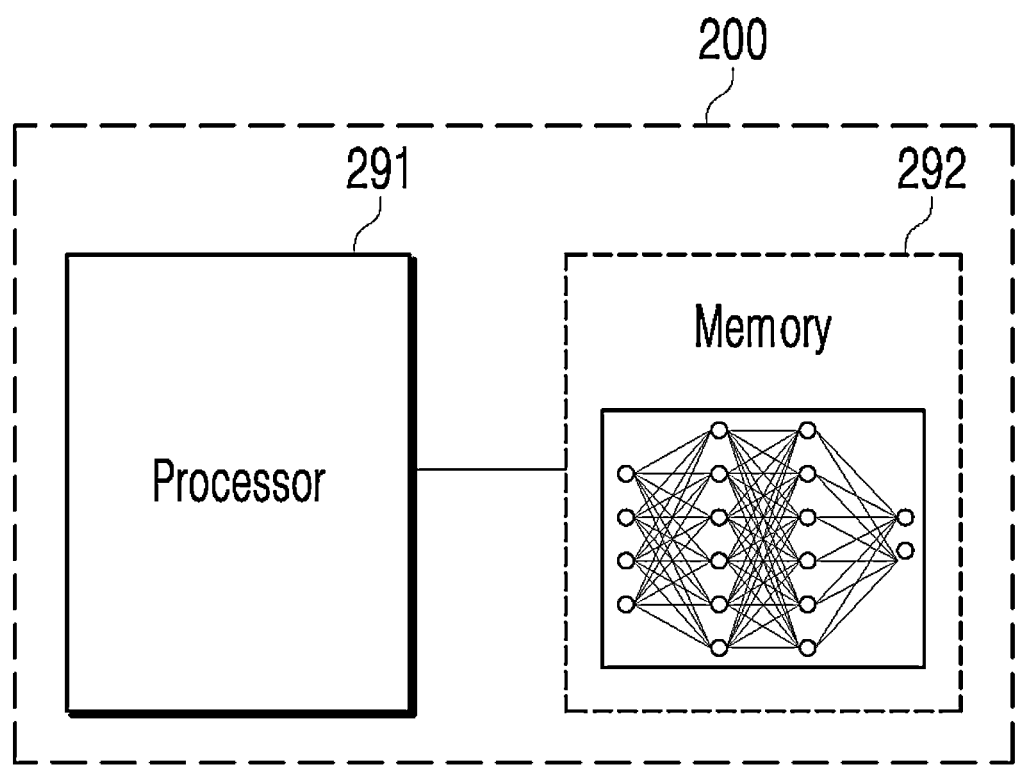
FIG. 9 is a block diagram schematically illustrating a configuration of a battery test apparatus according to another embodiment.

FIG. 9 is a block diagram schematically illustrating a configuration of a battery test apparatus according to another embodiment. In the following, description of redundant parts in FIG. 1 to FIG. 9 will be omitted. Referring to FIG. 9, the battery test apparatus according to another embodiment may include a processor 291 and a memory 292.

In the present embodiment, the processor 291 may execute functions executed by the user interface 220, the first test unit 240, the battery information acquisition unit 250, the second test unit 260, the power supply 270 and the controller 280 shown in FIG. 5.

In the present embodiment, the processor 291 may generate a prediction result of related information on battery cells using an artificial intelligence algorithm. The processor 291 may control the overall operation of the battery test apparatus 200. Here, the "processor" may refer to a data processing device embedded in hardware having a physically structured circuit to execute a function represented by, for example, code or instructions included in a program. As an example of the data processing device embedded in hardware as described above, a processing device such as a microprocessor, a central processing unit (CPU), a processor core, a multiprocessor, an application-specific integrated circuit (ASIC), or a field programmable gate array (FPGA) may be employed, but the scope of the present disclosure is not limited thereto.

In addition, the memory 292 may execute a function of temporarily or permanently storing data processed by the processor 291. Here, the memory 292 may include magnetic storage media or flash storage media, but the scope of the present disclosure is not limited thereto. The memory 292 may include an internal memory and/or an external memory and may include a volatile memory such as a DRAM, an SRAM, or an SDRAM, a non-volatile memory such as a one-time programmable ROM (OTPROM), a PROM, an EPROM, an EEPROM, a mask ROM, a flash ROM, a NAND flash memory, or a NOR flash memory, a flash drive such as an SSD, a compact flash (CF) card, an SD card, a micro-SD card, a mini-SD card, an Xd card, or a memory stick, or a storage device such as an HDD.

Figure 10:
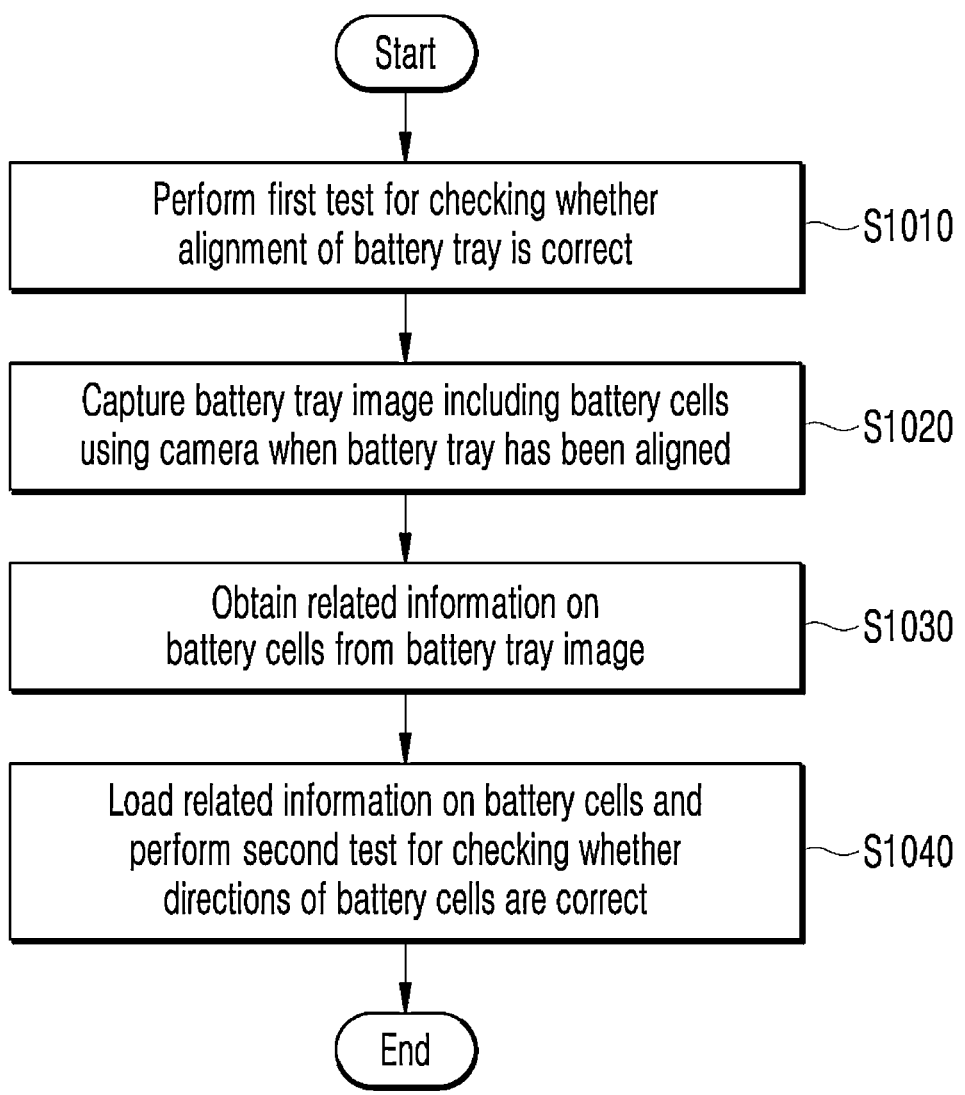
FIG. 10 and FIG. 11 are flowcharts for describing a method of driving a battery test apparatus according to the present embodiment.

FIG. 10 is a flowchart for describing a method of driving the battery test apparatus according to the present embodiment. In the following, description of redundant parts in FIG. 1 to FIG. 10 will be omitted.

Referring to FIG. 10, the battery test apparatus 200 may perform the first test for checking whether the alignment of the battery tray 120 is correct in step S1010. The battery test apparatus 200 may radiate a laser beam to the battery tray 120. The battery test apparatus 200 may receive a laser beam reflected from the battery tray 120. The battery test apparatus 200 may determine that the alignment of the battery tray 120 is correct if the signal strength of the laser beam reflected from the battery tray 120 is equal to or greater than a reference value. The battery test apparatus 200 may determine that the alignment of the battery tray 120 is incorrect if the signal strength of the laser beam reflected from the battery tray 120 is less than the reference value. Upon determining that the alignment of the battery tray 120 is incorrect, the battery test apparatus 200 may generate the first alarm for inducing rearrangement of the battery tray 120.

In step S1020, the battery test apparatus 200 may capture a battery tray image including a plurality of battery cells using the camera 230 when the battery tray 120 is correctly aligned.

In step S1030, the battery test apparatus 200 may acquire related information on battery cells from the battery tray image. The battery test apparatus 200 may predict the related information on battery cells using a deep neural network model trained in advance to predict related information on battery cells using a battery tray image including a plurality of battery cells. Here, the deep neural network model may be a model trained by a supervised learning method using training data having a battery tray image including a plurality of battery cells as input and having, as labels, first information indicating predicted positions of battery cells in the battery tray image, second information indicating the total number of battery cells in the battery tray image, third information indicating predicted positions of positive (+) pole signs and negative (−) pole signs indicated on the battery cells in the battery tray image, and fourth information indicating the total number of positive (+) pole signs and negative (−) pole signs detected from the battery tray image. In addition, the first information may include the start position of a battery cell, the width of the battery cell, and the height of the battery cell in the battery tray image, and the third information may include the start position of a positive (+) pole sign indicated on the battery cell and the start position of a negative (−) pole sign indicated on the battery cell.

In an optional embodiment, the battery test apparatus 200 may perform an additional test for additionally checking whether the alignment of the battery tray 120 is correct on the basis of the captured battery tray image. When performing the additional test, the battery test apparatus 200 may detect battery cells by comparing the battery tray image with prestored battery cell images. The battery test apparatus 200 may count the number of detected battery cells. The battery test apparatus 200 may determine that the alignment of the battery tray 120 is correct if the counted number of battery cells is equal to a preset reference number. The battery test apparatus 200 may determine that the battery tray 120 is incorrectly aligned if the counted number of battery cells is different from the preset reference number. When the battery test apparatus 200 determines that the alignment of the battery tray 120 is incorrect, the battery test apparatus 200 may generate the second alarm for inducing rearrangement of the battery tray 120.

In step S1040, the battery test apparatus 200 may load related information on the battery cell and perform the second test for checking whether the direction of a battery cell is correct. The battery test apparatus 200 may calculate the end position of the battery cell in the battery tray image using the first information. The battery test apparatus 200 may extract a partial image including the start position of the battery cell 130 and the end position of the battery cell 130 from the battery tray image. The battery test apparatus 200 may calculate a first distance value by subtracting the start position of the positive (+) pole sign from the width of the battery cell 130 included in the partial image and calculate a second distance value by subtracting the start position of the negative (−) pole sign from the width of the battery cell 130. The battery test apparatus 200 may determine whether the direction of the battery cell 130 is correct on the basis of a result of comparison between the first distance value and the second distance value. The battery test apparatus 200 may determine that the direction of the battery cell is correct if the first distance value exceeds the second distance value. The battery test apparatus 200 may determine that the direction of the battery cell is incorrect if the first distance value is equal to or less than the second distance value. When the first distance value is equal to or less than the second distance value, the battery test apparatus 200 may generate the third alarm for inducing a change in direction of the battery cell.

Thereafter, when the test on the current battery tray 120_1 is completed, the battery test apparatus 200 may start the test on the next battery tray 120_2.

Figure 11:
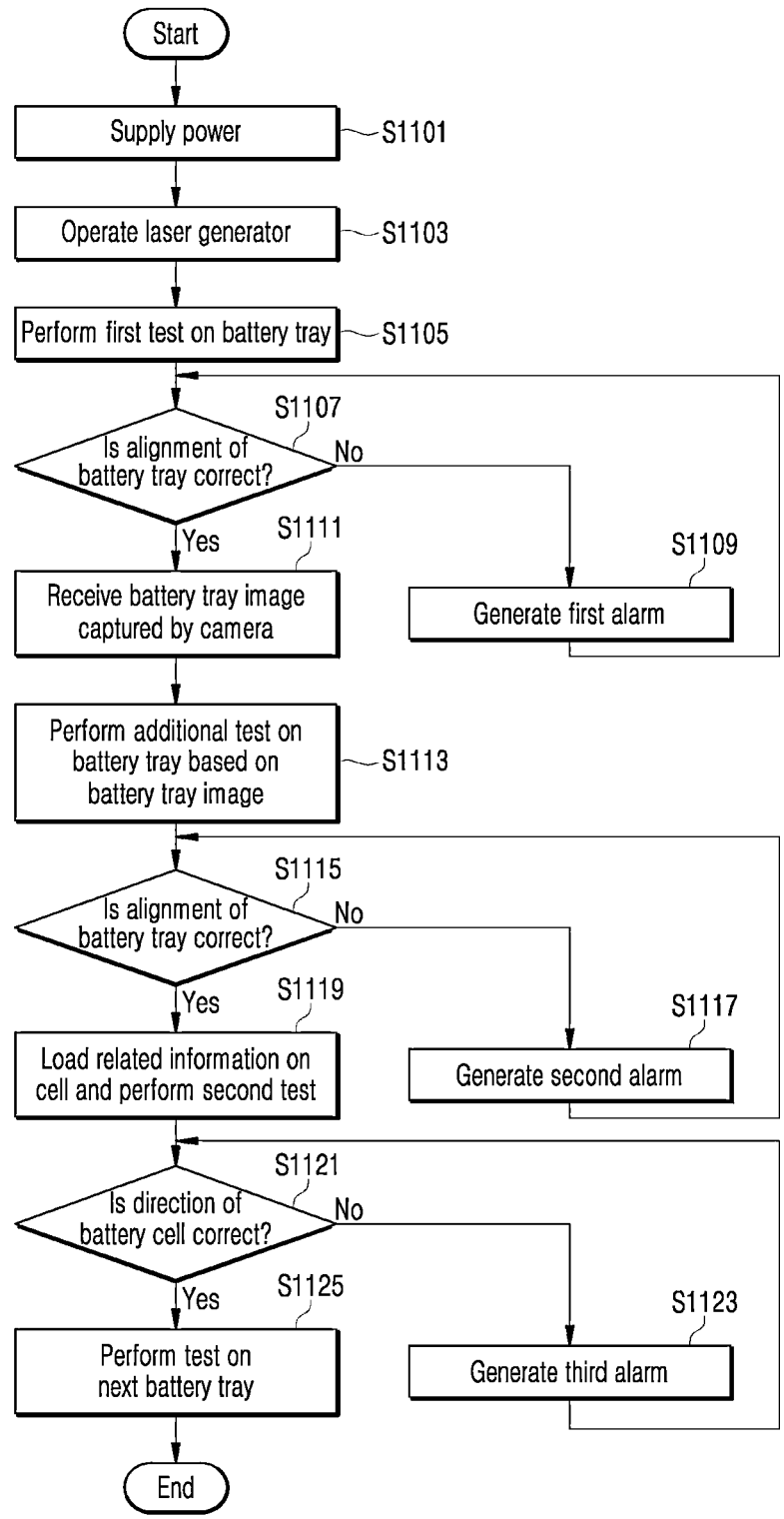

FIG. 11 is a flowchart for describing a method of driving the battery test apparatus according to another exemplary embodiment. In the following, description of redundant parts in FIG. 1 to FIG. 11 will be omitted.

Referring to FIG. 11, when power is supplied to the battery test apparatus 200, the battery tray 120 may operate the laser generator 210 in steps S1101 and S1103.

In step S1105, when the battery test apparatus 200 is moved around the battery stack 110, an initial battery tray alignment operation is performed by the operator, and the battery test apparatus 200 may perform the first test on the battery tray 120.

In step S1107, the battery test apparatus 200 may determine whether the alignment of the battery tray 120 is correct as a result of the first test performed on the battery tray 120.

In step S1109, upon determining that the alignment of the battery tray 120 is incorrect, the battery test apparatus 200 may generate the first alarm to induce rearrangement of the battery tray 120. The first alarm may be continuously generated until the alignment of the battery tray 120 becomes correct. Accordingly, the operator may rearrange the battery tray 120 or move the battery test apparatus 200.

In step S1111, when the alignment of the battery tray 120 is correct as a result of the first test, the battery test apparatus 200 may receive a battery tray image captured by the camera 230.

In step S1113, the battery test apparatus 200 may perform an additional test on the battery tray 120 on the basis of the battery tray image.

In step S1115, the battery test apparatus 200 may determine whether the alignment of the battery tray 120 is correct as a result of the additional test performed on the battery tray 120.

In step S1117, upon determining that the alignment of the battery tray 120 is incorrect, the battery test apparatus 200 may generate the second alarm to induce rearrangement of the battery tray 120. The second alarm may be continuously generated until the alignment of the battery tray 120 becomes correct. Accordingly, the operator may rearrange the battery tray 120 or move the battery test apparatus 200.

In step S1119, when the alignment of the battery tray 120 is correct, the battery test apparatus 200 may load related information on the battery cell and perform the second test to check whether the direction of the battery cell 130 is correct. In the present embodiment, the related information on the battery cell may be acquired by an artificial intelligence algorithm after the battery tray image is captured.

In step S1121, the battery test apparatus 200 may determine whether the direction of the battery cell 130 is correct as a result of the second test performed on the battery cell 130.

In step S1123, upon determining that the direction of the battery cell 130 is incorrect, the battery test apparatus 200 may generate the third alarm to induce a change in the direction of the battery cell 130. The third alarm may be continuously generated until the direction of the battery cell 130 becomes correct. Accordingly, the operator may change the direction of the battery cell 130.

In step S1125, upon determining that the direction of the battery cells 130 is correct, the battery test apparatus 200 may test the next battery tray.

The above-described embodiments according to the present disclosure may be implemented in the form of a computer program that can be executed through various components on a computer, and such a computer program may be recorded in computer-readable media. In this case, the media may include magnetic media such as a hard disk, a floppy disk and a magnetic tape, optical recording media such as a CD-ROM and a DVD, magneto-optical media such as a floptical disk, and hardware devices specially configured to store and execute program instructions, such as a ROM, a RAM, a flash memory, etc.

Meanwhile, the computer program may be specially designed and configured for the present disclosure or may be known and used by those skilled in the field of computer software field. Examples of the computer program may include not only machine code generated by a compiler but also high-level language code that can be executed by a computer using an interpreter or the like.

In the specification of the present disclosure (especially in the claims), the term "above" and similar referential terms may be used for both the singular and the plural. In addition, when a range is described in the present disclosure, each individual value constituting the range is described in the detailed description of the present disclosure as including the invention to which individual values belonging to the range are applied (unless there is a description to the contrary).

The steps constituting the method according to the present disclosure may be performed in an appropriate order unless the order is explicitly stated or there is no description to the contrary. The present disclosure is not necessarily limited to the order in which the steps are described. Use of all examples or exemplary terms (e.g., etc.) in the present disclosure is merely for the purpose of describing the present disclosure in detail, and the scope of the present disclosure is not limited by the examples or exemplary terms unless limited by the claims. In addition, those skilled in the art will recognize that various modifications, combinations, and changes can be made in accordance with design conditions and factors within the scope of the appended claims or their equivalents.

Therefore, the spirit of the present disclosure should not be limited to the above-described embodiments, and the claims which will be described below and all ranges equivalent to or changed from the claims will fall within the scope or spirit of the present disclosure.

What is claimed is:

1. A battery test method performed by a processor of a battery test apparatus, the method comprising:
    performing a first test for checking whether a battery tray has been correctly aligned with the battery test apparatus;
    capturing a battery tray image including a plurality of battery cells using a camera upon alignment of the battery tray;
    obtaining related information on the battery cells from the battery tray image; and
    loading the related information on the battery cells and performing a second test for checking whether directions of the battery cells are correct,
    wherein the obtaining of the related information on the battery cells comprises:
    detecting battery cells by comparing the battery tray image with prestored battery cell images;
    counting a number of the detected battery cells;
    determining that alignment of the battery tray is correct in response to the counted number of the detected battery cells equaling a preset reference number; and
    determining that alignment of the battery tray is incorrect in response to the counted number of the detected battery cells being different from the preset reference number.

2. The battery test method according to claim 1, wherein the performing of the first test comprises:
    radiating a laser beam to the battery tray;
    receiving a laser beam reflected from the battery tray;
    determining that alignment of the battery tray is correct in response to a signal intensity of the laser beam reflected from the battery tray being equal to or greater than a reference value; and
    determining that alignment of the battery tray is incorrect in response to the signal intensity of the laser beam reflected from the battery tray being less than the reference value.

3. The battery test method according to claim 2, further comprising generating a first alarm for inducing realignment of the battery tray upon determining that alignment of the battery tray is incorrect.

4. The battery test method according to claim 1, further comprising generating a second alarm for inducing realignment of the battery tray upon determining that alignment of the battery tray is incorrect.

5. The battery test method according to claim 1, wherein the obtaining of the related information on the battery cells comprises predicting the related information on the battery cells using a deep neural network model trained in advance to predict related information on a plurality of first battery cells using first battery tray images including the plurality of the first battery cells,
    wherein the deep neural network model is a model trained by a supervised learning method using training data having a second battery tray image including a plurality of second battery cells as input and having, as labels, first information indicating predicted positions of the second battery cells in the second battery tray image, second information indicating a total number of the second battery cells in the second battery tray image, third information indicating predicted positions of positive (+) pole signs and negative (−) pole signs indicated on the second battery cells in the second battery tray image, and fourth information indicating numbers of positive (+) pole signs and negative (−) pole signs detected from the second battery tray image, and
    wherein the first information includes start positions of the second battery cells in the second battery tray image, widths of the second battery cells, and heights of the second battery cells, and the third information includes start positions of the positive (+) pole signs indicated on the second battery cells and start positions of the negative (−) pole signs indicated on the second battery cells.

6. The battery test method according to claim 5, wherein the performing of the second test comprises:
    calculating end positions of the battery cells in the battery tray image using the first information;
    extracting a partial image including start positions of the battery cells and end positions of the battery cells from the battery tray image;
    calculating a first distance value by subtracting a start position of a positive (+) pole sign from a width of each battery cell included in the partial image and calculating a second distance value by subtracting a start position of a negative (−) pole sign from the width of each battery cell included in the partial image; and determining whether a direction of each battery cell is correct on a basis of a result of comparison between the first distance value and the second distance value.

7. The battery test method according to claim 6, wherein the determining of whether the direction of each battery cell is correct comprises:
determining that a direction of a corresponding battery cell is correct in response to the first distance value exceeding the second distance value; and
determining that the direction of the corresponding battery cell is incorrect in response to the first distance value being equal to or less than the second distance value.

8. The battery test method according to claim 7, further comprising generating a third alarm for inducing a change in the direction of the corresponding battery cell in response to the first distance value being equal to or less than the second distance value.

9. A non-transitory computer-readable recording medium storing instructions for performing a battery test method using a processor of a battery test apparatus, the battery test method comprising:
performing a first test for checking whether a battery tray has been correctly aligned with the battery test apparatus;
capturing a battery tray image including a plurality of battery cells using a camera upon alignment of the battery tray;
obtaining related information on the battery cells from the battery tray image; and
loading the related information on the battery cells and performing a second test for checking whether directions of the battery cells are correct,
wherein the obtaining of the related information on the battery cells comprises:
detecting battery cells by comparing the battery tray image with prestored battery cell images;
counting a number of the detected battery cells;
determining that alignment of the battery tray is correct in response to the counted number of the detected battery cells equaling a preset reference number; and
determining that alignment of the battery tray is incorrect in response to the counted number of the detected battery cells being different from the preset reference number.

10. A battery test apparatus comprising:
a camera configured to face a position at which a battery tray is disposed;
a processor; and
a memory operably connected to the processor and storing at least one code executed in the processor, wherein the memory stores code that causes, when executed by the processor, the processor to:
perform a first test for checking whether the battery tray has been correctly aligned in accordance with the battery test apparatus;
capture a battery tray image including a plurality of battery cells using the camera upon alignment of the battery tray;
obtain related information on the battery cells from the battery tray image; and
load the related information on the battery cells and perform a second test for checking whether directions of the battery cells are correct,
wherein the memory stores code that causes the processor to detect battery cells by comparing the battery tray image with prestored battery cell images, to count a number of the detected battery cells, to determine that alignment of the battery tray is correct in response to the counted number of the detected battery cells equaling a preset reference number, and to determine that alignment of the battery tray is incorrect in response to the counted number of the detected battery cells being different from the preset reference number.

11. The battery test apparatus according to claim 10, wherein the memory stores code that causes the processor to radiate a laser beam to the battery tray, to receive a laser beam reflected from the battery tray, to determine that alignment of the battery tray is correct in response to a signal intensity of the laser beam reflected from the battery tray being equal to or greater than a reference value, and to determine that alignment of the battery tray is incorrect in response to the signal intensity of the laser beam reflected from the battery tray being less than the reference value.

12. The battery test apparatus according to claim 11, wherein the memory further stores code that causes the processor to generate a first alarm for inducing realignment of the battery tray upon determining that alignment of the battery tray is incorrect.

13. The battery test apparatus according to claim 10, wherein the memory further stores code that causes the processor to generate a second alarm for inducing realignment of the battery tray upon determining that alignment of the battery tray is incorrect.

14. The battery test apparatus according to claim 10, wherein the memory stores code that causes the processor to predict the related information on the battery cells using a deep neural network model trained in advance to predict related information on a plurality of first battery cells using first battery tray images including the plurality of the first battery cells,
wherein the deep neural network model is a model trained by a supervised learning method using training data having a second battery tray image including a plurality of second battery cells as input and having, as labels, first information indicating predicted positions of the second battery cells in the second battery tray image, second information indicating a total number of the second battery cells in the second battery tray image, third information indicating predicted positions of positive (+) pole signs and negative (−) pole signs indicated on the second battery cells in the second battery tray image, and fourth information indicating numbers of positive (+) pole signs and negative (−) pole signs detected from the second battery tray image, and
wherein the first information includes start positions of the second battery cells in the second battery tray image, widths of the second battery cells, and heights of the second battery cells, and the third information includes start positions of the positive (+) pole signs indicated on the second battery cells and start positions of the negative (−) pole signs indicated on the second battery cells.

15. The battery test apparatus according to claim 14, wherein the memory stores code that causes the processor to calculate end positions of the battery cells in the battery tray image using the first information, to extract a partial image including start positions of the battery cells and end positions of the battery cells from the battery tray image, to calculate a first distance value by subtracting a start position of a positive (+) pole sign from a width of each battery cell included in the partial image and calculate a second distance value by subtracting a start position of a negative (−) pole sign from the width of each battery cell included in the partial image, and to determine whether a direction of each battery cell is correct on a basis of a result of comparison between the first distance value and the second distance value.

16. The battery test apparatus according to claim 15, wherein the memory stores code that causes the processor to determine that a direction of a corresponding battery cell is correct in response to the first distance value exceeding the second distance value and to determine that the direction of the corresponding battery cell is incorrect in response to the first distance value being equal to or less than the second distance value.

17. The battery test apparatus according to claim 16, wherein the memory further stores code that causes the processor to generate a third alarm for inducing a change in the direction of the corresponding battery cell in response to the first distance value being equal to or less than the second distance value.

18. The battery test apparatus according to claim 10, further comprising:

a support configured to support the bottom of the battery tray; and a laser generator configured to radiate a laser beam toward the bottom of the battery tray, wherein the battery tray includes at least one penetration hole through which the laser beam passes when the battery tray is arranged to be aligned with the battery test apparatus, and wherein the support includes a sensor configured to detect the laser beam that has passed, and the memory stores code that causes the processor to determine that the battery tray has been aligned when the laser beam is detected by the sensor on the support.

* * * * *